US006980566B2

(12) United States Patent
Melick et al.

(10) Patent No.: US 6,980,566 B2
(45) Date of Patent: Dec. 27, 2005

(54) METHOD FOR ROUTING DATA PACKETS USING AN IP ADDRESS BASED IN GEO POSITION

(75) Inventors: Bruce D. Melick, Cedar Rapids, IA (US); David M. Snyder, Cedar Rapids, IA (US); Leslie D. Baych, Cedar Rapids, IA (US)

(73) Assignee: Lightwaves Systems, Inc., Cedar Rapids, IA (US)

( * ) Notice: Subject to any disclaimer, the term of this patent is extended or adjusted under 35 U.S.C. 154(b) by 895 days.

(21) Appl. No.: 09/803,270

(22) Filed: Mar. 8, 2001

(65) Prior Publication Data

US 2001/0036183 A1 Nov. 1, 2001

Related U.S. Application Data

(60) Provisional application No. 60/188,416, filed on Mar. 10, 2000.

(51) Int. Cl.⁷ .............................................. H04J 3/22
(52) U.S. Cl. ..................................... 370/471; 370/392
(58) Field of Search ............................... 370/389, 392, 370/395.1, 395.52, 395.54, 471, 475

(56) References Cited

U.S. PATENT DOCUMENTS

| | | | | |
|---|---|---|---|---|
| 4,939,726 A | * | 7/1990 | Flammer et al. ............ | 370/400 |
| 5,088,032 A | * | 2/1992 | Bosack ........................ | 709/242 |
| 5,155,857 A | * | 10/1992 | Kunisaki et al. ............ | 709/223 |
| 5,425,021 A | * | 6/1995 | Derby et al. ................ | 370/408 |
| 5,453,977 A | * | 9/1995 | Flammer et al. ............ | 370/254 |
| 5,636,216 A | * | 6/1997 | Fox et al. .................... | 370/402 |
| 5,952,958 A | | 9/1999 | Speasl et al. | |
| 6,054,950 A | | 4/2000 | Fontana | |
| 6,684,250 B2 | * | 1/2004 | Anderson et al. ........... | 709/225 |
| 6,757,740 B1 | * | 6/2004 | Parekh et al. ............... | 709/245 |

OTHER PUBLICATIONS

"The Concept of CDPD Makes Sense," by Bill Clede, http://www.clede.com/Articles/Police/cdpd.htm.
"A Border Gateway Protocol (BGP)," by Kirk Lougheed and Yakov Rekhter, http://www.faqs.org/rfcs/rfc1163.html.
"GSM Cellular Radio Telephony," by Joachim Tisal, May 1997, John Wiley & Sons, pp. 20-165.
"Being Digital," By Nicholas Negroponte, 1995, Vintage Books, pp. 49-61, 69-74, 143-148, 173-195, 209-218.

(Continued)

Primary Examiner—John Pezzlo
Assistant Examiner—Donald Mills
(74) Attorney, Agent, or Firm—McKee, Voorhees & Sease, P.L.C.

(57) ABSTRACT

Method of routing data over a network in which contact is made with a home network to determine the reported geo-position, using this geo-position to transmit data to the device over a path through a node in which the node reads the geo-position, accesses a list of possible recipients and their geo-positions, compares its location to the positions, selects a recipient based at least in part on the proximity of the recipient to the device, and transmits the data over the best path. Eventually, the device becomes the recipient. A geo-position may be transmitted as part of an IP address. The geo-position information can be generated from a GPS receiver. This method and/or IP address may be used in a method of doing business in which the geo-position is used to identify the source and location for delivery. This information may be incorporated into a purchase order or confirmation receipt.

7 Claims, 3 Drawing Sheets

OTHER PUBLICATIONS

"Future Talk—The Changing Wireless Game," by Ron Schneiderman, 1997, IEEE Press, pp. 19-23, 27-28, 37-49, 77-116, 131-143, 149-155.

"The Essential Guide to Telecommunications," by Annabel Z. Dodd, 2000, Prentice Hall, pp. 143-221, 231-237, 255-266, 288-343.

"Xun Su's Little Simulator for Dijkstra's Algorithm," by Carla Laffra, http://www.ece.utexas.edu/~xsu/shortest.html.

TechEncyclopedia article "TCP/IP abc's" Feb. 24, 2000, 12 pages from Internet Web site www.techweb.com.

TechSearch article Network Computing Mar. 15, 1998 Issue 905, "Slicing Through IP Switching" by Joel Conover, 13 pages.

Network Working Group, T. Socolofsky, C. Kale, Spider Systems Limited, Jan. 1991, "A TCP/IP Tutorial" from ftp.rfc-editor.org/in-notes/rfc1180.txt, 25 pages.

CNN.com Technology, "Mobile IP will Fuel Mobil Computing Boom," Mar. 1, 2000, by Ana Orubeondo from www.cnn.com/2000/TECH/computing/03/01/mobile.ip.idg/index.html, 3 pages.

"Internet Protocol," Darpa Internet Program, Protocol Specification, Sep. 1981 prepared for Defense Advanced Research Projects Agency, Information Processing Techniques Office, by Information Sciences Institute. University of Southern California, 28 pages from http://194.52.182.96/rfc/rfc791.html.

* cited by examiner

METHOD FOR ROUTING DATA PACKETS USING AN IP ADDRESS BASED IN GEO POSITION

CROSS REFERENCE TO RELATED APPLICATION

This application is a conversion of and claims priority to prior U.S. Provisional Patent Application Ser. No. 60/188,416, filed on Mar. 10, 2000 which is entitled and is herein incorporated by reference.

BACKGROUND OF THE INVENTION

1. Field of the Invention

The present invention relates generally to a method for routing data packets. More particularly, the present invention relates to transmission control protocol based on Internet protocol, which uses geo-position instead of an IP address.

2. Problems in the Art

Currently, an application, such as a mail program, which desires to send or receive data, must rely on the TCP/IP layered set of protocols. Though other transmission control protocols, such as file transfer protocol, link access protocol, balanced file transfer access method, product definition interchange format, and asynchronous transfer mode, exist, it is the transmission control protocol/internet protocol(TCP/IP) which has become dominantly used. In general, TCP, transmission control protocol, is responsible for ensuring that data and other commands get through to the desired location. IP, or Internet Protocol, is a set of commands relied upon by TCP and others to get the data to its desired location. IP uses what have become known as IP addresses.

An IP address is currently a 32-bit number that identifies the sender and receiver of information. As the number of IP addresses is rapidly approaching the capacity limits of a 32-bit based number, there is a trend to implement a 128-bit based IP address system, known as Internet Protocol version 6 (IPv6). IPv6 is a more efficient protocol than the current version, IPv4, because there are so many more addresses available and can be distributed much more efficiently, greatly reducing the amount of work routers have to do. Even so, IPv6 cannot mathematically self-route data packets.

IPv6 must provide similar guarantees of anonymity as the current version, IPv4, which occurs using a "dynamic host" system that changes the users' various addresses. However, the requirement of a "dynamic host" is an extra step that requires computing resources and additional time on the telecommunication network.

The IP address has two parts, a particular network identifier and a specific device identifier. A router is either a device or a piece of software which is used to direct the flow of traffic and does so by examining the network portion of the IP address. Routers are connected to at least two networks on a gateway. The router maintains a table or library of available networks and determines, based on its understanding of the state of the networks it is connected to, just how a packet of data should be sent across the Internet. This library may be either a static routing table or a dynamic routing table.

A static routing table does not adjust to ever changing network conditions, so each change in the table or library must be done manually by the network administrator. Dynamic routing tables are built not by network administrators, but by routing protocols. These routing protocols exchange routing information and this information is then used to update the routing table. A routing protocol allows the gateways to adapt to network changes. Depending on whether the system on which routing is to occur is autonomous, the network administrator may choose to use either an interior or exterior routing protocol.

There are many interior routing protocols. Two such interior routing protocols are the routing information protocol and the open shortest path first protocol. Routing information protocol selects a route with the lowest number of gateways through which data must pass to reach its destination. It follows a distance-vector algorithm.

Open shortest path first protocol builds a directed graph of the entire network using the Dijkstra shortest path first algorithm. This algorithm works by assigning a cost of 0 to the root system in the network. It then locates the neighbors of the system and calculates the cost to reach each neighbor based on the sum of the cost to reach the system just installed plus the cost advertised for reaching each neighbor.

The open shortest path first protocol system must locate its neighbors through the use of hello packets. These hello packets are sent and then the system must listen for a return hello packet. The hello packet identifies the local router and lists the adjacent routers from which it has received packets. Receipt of a hello packet informs the router that it is an adjacent router to the sender and therefore this sender is a neighbor. This newly discovered neighbor is then added to the library.

The open shortest path first protocol then advertises all of its neighbors by flooding a Link State Advertisement (LSA) to the entire network. Another complex function of the protocol is to ensure no flooding of duplicate LSAs. This is done by comparing each LSA to previously received LSAs and discarding and duplicates.

Exterior routing protocols exchange routing information between autonomous systems. The leading exterior routing protocol is Border Gateway Protocol (BGP). BGP exchanges reachability through update messages. Like hello packets, these update messages are then used to build a routing table. Unlike open shortest path first protocol, BGP supports policy based routing which employs political, organizational, and security considerations when making routing decisions.

BGP acquires its neighbors through a standard TCP handshake and refers to them as peers. These peers send each other complete routing table updates when the connection is initially established. After the initial encounter, peers only send each other changes or messages indicating that they are still alive called Keepalive messages.

The use of hello packets, LSA, update messages, and keepalive messages is an unnecessary waste of computer and network processing, speed, and storage. These various messages all serve to update and monitor the routing table which is used to determine the best path for a data packet to take.

As communications move into the wireless age, it is becoming more and more important to develop a method of sending and receiving data from any point on earth. There is an effort under way to establish a mobile IP standard which would allow a user of any device which is capable of accessing the Internet to send and receive data from any point on earth.

Mobile IP allows any mobile node to move about, changing its point of attachment to the Internet, while continuing to be identified by its home IP address. Correspondent nodes send IP datagrams to a mobile node at its home address in the same way as with any other destination. This scheme allows transparent interoperation between mobile nodes and their correspondent nodes, but forces all datagrams for a mobile node to be routed through its home agent. Thus, datagrams to the mobile node are often routed along paths that are significantly longer than optimal. For example, if a mobile node is visiting some subnet, even datagrams from a correspondent node on the same subnet must be routed through the Internet to the mobile node's home agent (on its home network), only then to be tunneled back to the original subnet for final delivery. This indirect routing delays the delivery of the datagrams to mobile nodes, and places an unnecessary burden on the networks and routers along their paths through the Internet.

There is therefore a need for a method of routing data packets, which avoids these and other problems.

FEATURES OF THE INVENTION

A general feature of the present invention is the provision of method of routing data packets, which overcomes the problems found in the prior art.

A further feature of the present invention is the provision of a modified IP address which includes a geographic position based header.

A further feature of the present invention is the provision of a transmission control protocol which is based on the Internet protocol using geographic position.

Another feature of the present invention is the provision of a method of routing data packets based on a modified IP address which includes a geographic position based header.

Another feature of the present invention is the provision of a method of routing data packets based on the geographic position ("geo-position") header which requires no library of neighbors or peers beyond those neighbors or peers directly connected to the sending system.

A still further feature of the present invention is the provision of a method of routing data packets which mathematically determines the shortest path available to the next system based on the geo-position based header.

A still yet further feature of the present invention is the provision of a method of using geo-position IP address in conjunction with GPS time and date stamps to automatically create unique identification numbers that can become the basis of a method of doing business that will identify the sender by geographic position, and with the addition of the GPS time and date stamp to the geographic position create unique purchase order numbers, ship confirm numbers, pallet identifiers, order numbers, etc., and can be used as self-routers for all types of business transactions.

These, as well as other features and advantages of the present invention will become apparent from the following specification and claims.

SUMMARY OF THE INVENTION

The present invention generally comprises a method for routing data packets. More particularly, the present invention comprises a method for routing data packets based on a geographic position header contained in a modified IP address. A geographic position header is data referenced by spatial or geographic coordinates.

In a preferred embodiment, the present invention includes a modified IP address in which the network number currently assigned is replaced by a geographic position. Such geographic position may be constantly changing, and therefore the IP address of the device is constantly changing. These changes are accommodated by reporting of current geo-position to a telecommunications network such as is currently done in the cellular telephone industry.

Chip manufacturers, such as Intel, have proposed and even manufactured computer chips which include a unique identifier. This unique identifier may be used to identify a device, thereby eliminating the need for the network/specific device identifier system currently used in IP. As more and more networks are established and more and more devices are hooked to the Internet, specific device identification must become independent from any host network.

Using the geo-position in place of the IP network address allows the transfer control protocol to base all routing decisions on the physical location of the specific devices between which a connection is desired. The transmission control protocol using geo-position data will hereinafter be referred to as the GeoTCP. GeoTCP makes routing decisions by mathematically determining the shortest route between the two devices.

Upon determining where the two devices are located, GeoTCP will mathematically determine the shortest network distance between the two devices without requiring the transmission of data packets through either devices' home network. For instance, assume one device is roaming on a foreign network, but telling its home network of any change in the first device's geo-position. This information is stored on the home network in any type of memory. When the second device contacts the home network via GeoTCP, the home network will access the stored geo-position of the first device and inform the second device of the first device's geo-position. The second device will store this geo-position in its memory either permanently or temporarily. GeoTCP will use this geo-position in its calculation of the shortest network path with which to send data packets to the first device.

All systems, gateways, and other network devices (nodes) will have an independent geo-position and temporary and permanent memory or storage devices such as RAM, ROM, tape drives, or hard drives. Knowing their own geo-position allows all of these nodes to simply calculate where to send the data packets by knowing only their neighbors geo-position. The only library which must be maintained in the memory of the network or in a storage medium, is a neighborhood library. The neighborhood library will give the locations for all neighbors of the node. GeoTCP will ensure that there is a valid connection as is currently done. However, should a connection be lost, interrupted, too busy, or otherwise made unavailable, GeoTCP would make the determination of the next best node (recipient) to use based on the relative geo-position of all of the remaining neighbors. Once a connection has been established by GeoTCP, transfer of data packets to a specific device based on that device's geo-position is accomplished.

Currently, domain names are converted to IP addresses as computers cannot understand human language. This would not change, except rather than convert the domain name to an IP address using a network/specific device number, devices would convert domain names to a number which represents both the specific device identifier and the device's last known geo-position.

DETAILED DESCRIPTION OF THE PREFERRED EMBODIMENT(S)

Figure 1:
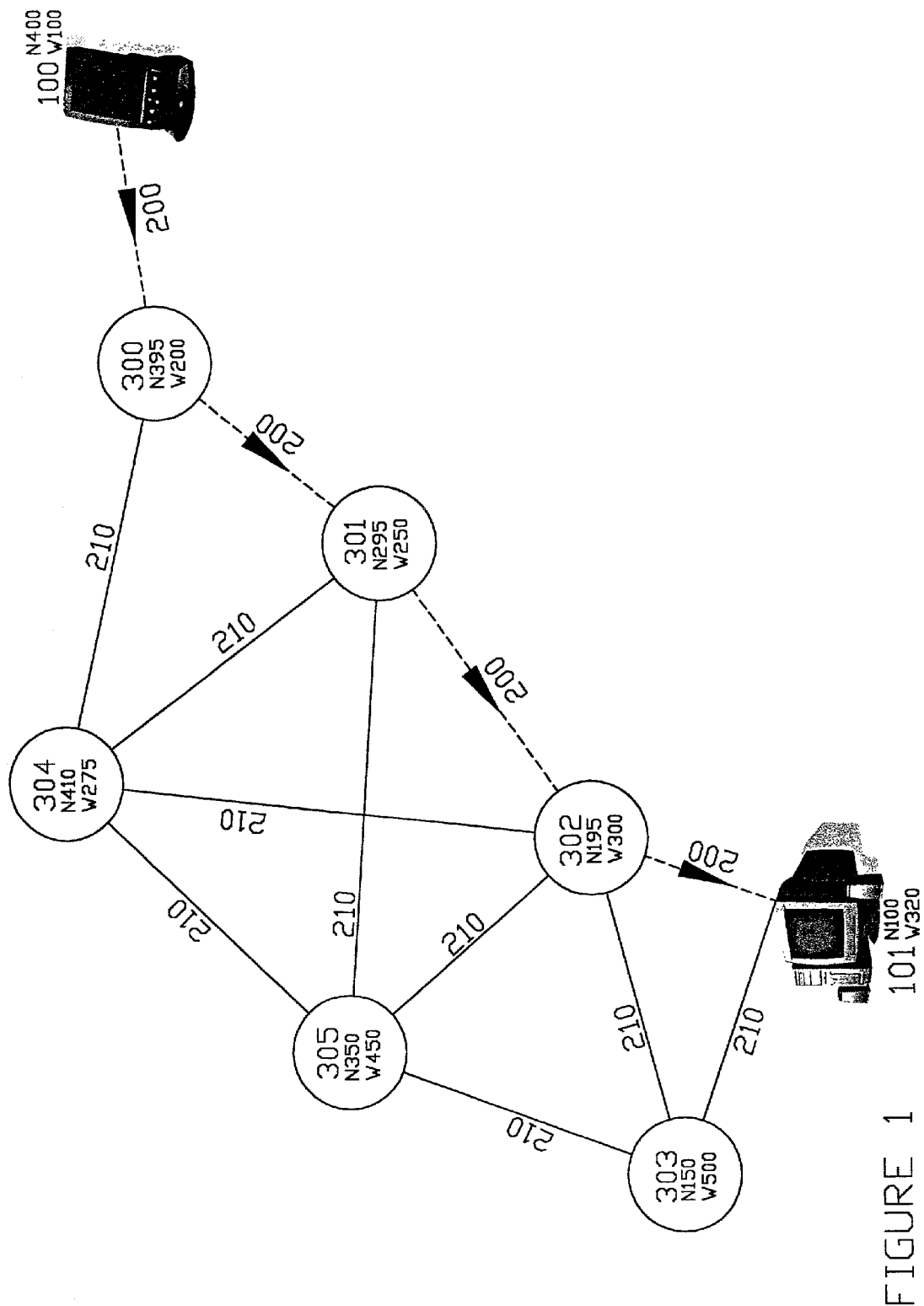
FIG. 1 is a representation of the mathematically, self-determined route between two devices connected to a telecommunications network.

In FIG. 1, device 100 is shown as a Personal Digital Assistant (PDA) connected to a telecommunications network. Item 100 is shown as a PDA, but may be a computer, a network server, a wireless phone, or any other device that has the capability of being connected to a network. The route depicted by a dotted line between the two devices, for the purpose of exchanging data, is the shortest route that can be mathematically self-determined using the geo-position of each device shown on the drawing.

Outdoor geo-position information may be obtained using any Global Navigation Satellite System, such as GPS or GLONASS.

Indoor geo-positions may be obtained by any number of means. There are patented schemes such Speasl et al, U.S. Pat. No. 5,952,958, or an ultra wideband system such as Robert J. Fontana, U.S. Pat. No. 6,054,950, or the time domain, ultra wideband system that is integrated and correlated with GPS and documented in U.S. patent application Ser. No. 09/686,181, Melick et al.

In addition, indoor and outdoor geo-position information may be obtained from commercially available software that drives map based information. Commercially available software such as AutoCAD MAP, and AutoCAD Mapguide can be used to control, store, and retrieve GPS data, and other data stored in other types of databases.

Examples of geo-position based IP addresses are, but not limited to, as the two show below.

Example 1) In Lat/Long/Alt—Consists Of 3 Components
42.02.17.00=Latitude North (Deg., Min., Sec., Decimal Seconds)
90.05.18.05=Longitude West(Deg., Min., Sec., Decimal Seconds)
285.00=Altitude (Feet., Decimal Feet)
A Lat/Long/Alt address might look like: 042021700.090051805.0028500
Example 2) Earth Centered Earth Fixed (ECEF)—Consists of 4 Components
"ECEF=Cartesian coordinates with center of earth being 0,0,0, (x,y,z)"
10,000,000.56=Northing from Greenwich (Meters., Decimal Meters)
8,900,753.45=Easting from Greenwich (Meters., Decimal Meters)
285.00=Altitude Above Mean Sea Level (Feet., Decimal Feet)
Code No. For Datum, i.e. WGS84=1, North American 1927=2, Cape Canaveral=3, European 1979=4, etc.
An ECEF address might look like: 1000000056.0890075345.0028500.03

Device 101 is shown as a computer connected to a telecommunications network. Item 101 is shown as a computer, but may be a PDA, a network server, a wireless phone, or any other device that has the capability of being connected to a network.

PDA 100 and computer 101 are depicted as having a distinct instantaneous geo-position. Instantaneous means if PDA 100 or computer 101 are mobile, they will report on a regular basis to the telecommunications network their instantaneous geo-position. A fixed asset, such as a node 300, 301, 302, 303, 304, 305 will have unchanging instantaneous positions. PDA 100's geo-position is depicted as northing and westing offsets in any one of various specific co-ordinate systems, such as but not limited to WGS-84, North American 1927 or 1983, Cape Canaveral, European 1979, or any user-defined co-ordinate system. These geo-positions can alternately be depicted as longitudes and latitudes.

PDA 100 is telecommunicating data packets, which can be data, to device 101, a computer, which is also connected to the same telecommunications network. PDA 100 and computer 101 are capable of transmitting and/or receiving appropriately configured data packets.

Figure 2:
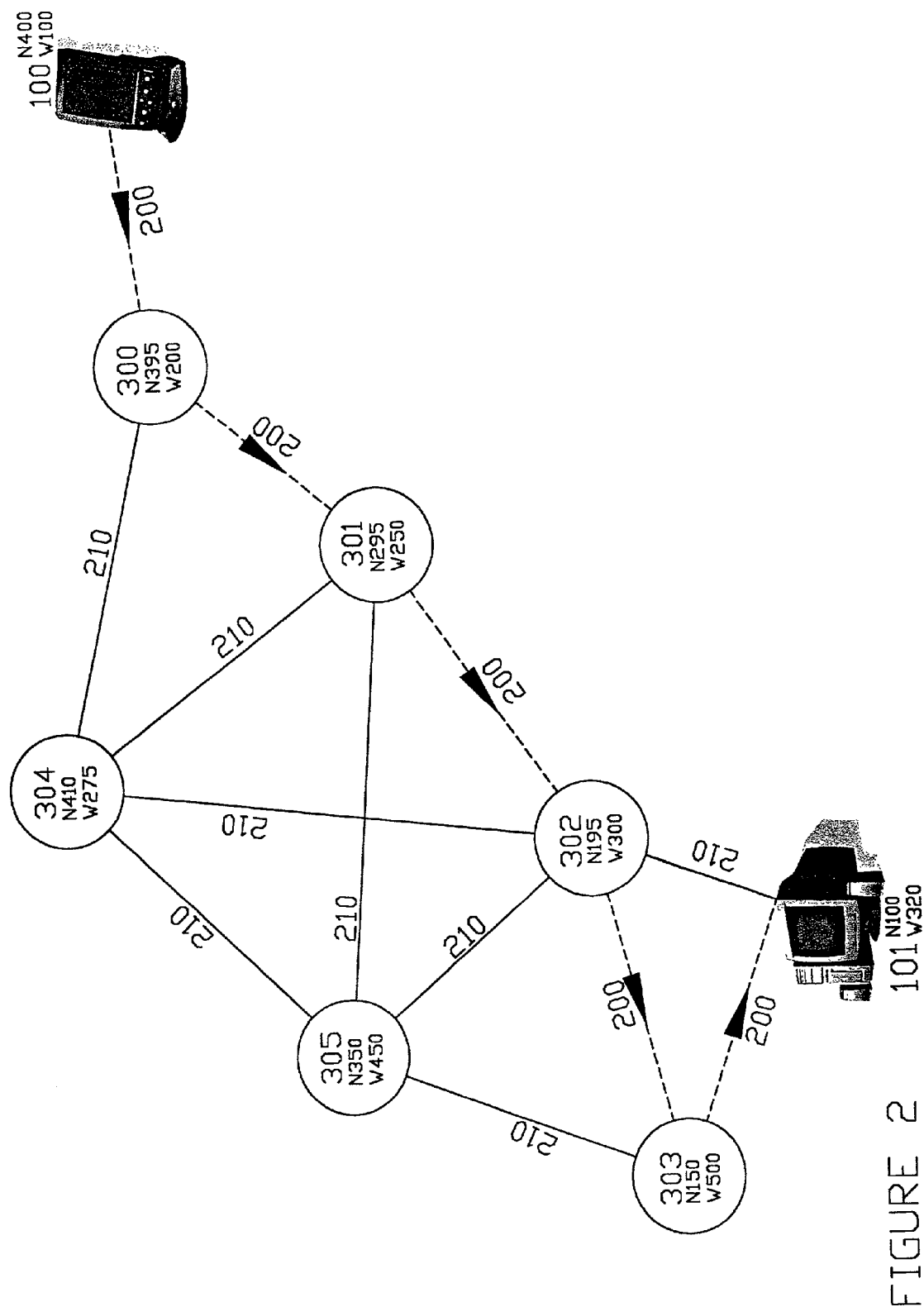
FIG. 2 is a perspective view of an alternate representation of FIG. 1 when one of the telecommunications nodes has an open switch on one of the shortest route legs.

Appropriately configured as used above is defined as data packets enabled with the present invention's transmission control protocol based on geo-position data, shown as northings and westings in FIGS. 1 and 2. This geo-position data can be used by nodes 300, 301, 302, 303, 304, 305 to mathematically self-determine the routing of data packets from PDA 100 to computer 101 over a telecommunications network.

The telecommunications network depicted consists of the following: items 200 are closed switch transmission paths, which are the shortest mathematically self-determined transmission paths of the telecommunications network from PDA 100 to computer 101. Closed switch transmission paths 200 may be either hard-wired or wireless, asymmetric or symmetric.

Items 210 are open switch transmission paths on the telecommunications network. These paths are not mathematically self-determined as being the shortest transmission paths from PDA 100 to computer 101. Open switch transmission paths 210 may be either hard-wired or wireless, asymmetric or symmetric.

The closed switch transmission paths 200 and the open switch transmission paths 210 are inter-connected between nodes 300, 301, 302, 303, 304, 305. Each node 300, 301, 302, 303, 304, 305 has a distinct geo-position, shown as northings and westings in FIG. 1. nodes 300, 301, 302, 303, 304, 305 are intelligent.

An intelligent node, intelligent means the node is a switched hub that is programmable, 300, 301, 302, 303, 304, 305 can read and use geo-position header data in a telecommunications data packet, to mathematically self-determine the shortest route between PDA 100 and computer 101. The data required is the geo-position of the origination device PDA 100, the geo-position of a node 300, 301, 302, 303, 304, 305, the geo-position of each node it is directly connected to, and the geo-position of the destination device, computer 101.

Prior to the telecommunication of data packets, some or all of the following call set-up information is required:
1) How long is the data packet?
2) Is the destination fixed or mobile?
3) Is the origination fixed or mobile?
4) Is the communication link asymmetric or symmetric?
5) Is the destination local or long distance?

As data packets are transmitted between PDA 100 and computer 101, nodes 300, 301, 302, 303, 304, 305 use geo-position data to mathematically self-determine the shortest route. The following mathematics is related to node 300. Other nodes 301, 302, 303, 304, 305 will perform similar calculations based on their specific geo-position data.

For the purpose of this discussion northings and westings are positive numbers, and southings and eastings are negative numbers.

1) Node 300 processor subtracts computer 101 northing from PDA 100 northing.
2) Node 300 processor temporarily stores northing difference result.

PDA 100N−Computer 101N=Northing Delta (Total Transmission Path)

3) Node 300 processor subtracts computer 101 westing from PDA 100 westing.
4) Node 300 processor temporarily stores westing difference result.

PDA 100W−Computer 101W=Westing Delta (Total Transmission Path)

5) Node 300 processor subtracts northing of node 304 from northing of node 300.
6) Node 300 processor temporarily stores result from step 5.

node 300N−node 304N=Northing Delta (node 300 to node 304)

7) node 300 processor subtracts westing of node 304 from westing of node 300.
8) Node 300 processor temporarily stores result from step 7.

node 300W−node 304W=Westing Delta (node 300 to node 304)

9) Node 300 processor subtracts northing of node 301 from northing of node 300.
10) Node 300 processor temporarily stores result from step 9.

node 300N−node 301N=Northing Delta (node 300 to node 301)

11) Node 300 processor subtracts westing node 301 from westing of node 300.
12) Node 300 processor temporarily stores result from step 11.

node 300W−node 301W=Westing Delta (node 300 to node 301)

13) Node 300 processor subtracts value stored in step 6 from value stored in step 2.
14) Node 300 processor temporarily stores result from step 13.

Step 2−Step 6=Northing Delta

Total Transmission Path Northing Difference Minus node 300 To node 304 Northing Difference 15) Node 300 processor subtracts value stored in step 8 from value stored in step 4.
16) Node 300 processor temporarily stores results from step 15.

Step 4−Step 8=Westing Delta

Total Transmission Path Westing Difference Minus node 300 To node 304 Westing Difference 17) Node 300 processor subtracts value stored in step 10 from value stored in step 2.
18) Node 300 processor temporarily stores results from step 17.

Step 2−Step 10=Northing Delta

Total Transmission Path Northing Difference Minus node 300 To node 301 Northing Difference 19) Node 300 processor subtracts value stored in step 12 from value stored in step 4.
20) Node 300 processor temporarily stores results from step 19.

Step 4−Step 12=Westing Delta

Total Transmission Path Westing Difference Minus node 300 To node 301 Westing Difference 21) Node 300 processor adds value stored in step 14 to value stored in step 16.
22) Node 300 processor temporarily stores results from step 21.

Step 14+Step 16=Directional Indicator For node 304

For this discussion, the term Directional Indicator is not absolute distance and direction, but is a weighted value based on accumulated Northings and Westings of the Total Transmission Path in relationship to a specific node.

23) Node 300 processor adds value stored in step 18 to value stored in step 20.
24) Node 300 processor temporarily stores results from step 23.

Step 18+Step 20=Directional Indicator For node 301

25) Node 300 processor uses smallest value stored in step 22 and step 24 as the logic to close the switch to node 301, and open the switch to node 304.
   If: step 22<step 24,
   Then: close switch to node 304,
   Otherwise: open switch to node 304,
   If: node 304 switch is open,
   Then: close switch to node 301,
   Otherwise: open switch to node 301

FIG. 2 depicts an alternate closed switch transmission path 200 as a result of the opening of a switch on node 302 causing data packets to be redirected to node 303 before completing the closed switch transmission path 200 to computer 101. The open switch on node 302 may be the result of a traffic overload, or repairs on transmission path 210 from node 302 to computer 101. Device 100 is shown as a Personal Digital Assistant (PDA) connected to a telecommunications network. Item 100 is shown as a PDA, but may be a computer, a network server, a wireless phone, or any other device that has the capability of being connected to a network.

Device 101 is shown as a computer connected to a telecommunications network. Item 101 is shown as a computer, but may be a PDA, a network server, a wireless phone, or any other device that has the capability of being connected to a network.

PDA 100 and computer 101 are depicted as having a distinct instantaneous geo-position. Instantaneous means if PDA 100 or computer 101 are mobile, they will report on a regular basis to the telecommunications network their instantaneous geo-position. A fixed asset, such as a node 300, 301, 302, 303, 304, 305 will have unchanging instantaneous positions. PDA 100's geo-position is depicted as northing and westing offsets in any one of various specific co-ordinate systems, such as but not limited to WGS-84, North American 1927 or 1983, Cape Canaveral, European 1979, or any user-defined co-ordinate system. These geo-positions can alternately be depicted as longitudes and latitudes.

PDA 100 is telecommunicating data packets, which can be data, to device 101 a computer, which is also connected to the same telecommunications network. PDA 100 and computer 101 are capable of transmitting and/or receiving appropriately configured data packets.

Appropriately configured is defined a data packets enabled with the present invention's transmission control protocol based on geo-position data, shown as northings and westings in FIGS. 1 and 2. This geo-position data can be used by nodes 300, 301, 302, 303, 304, 305 to mathematically self-determine the routing of data packets from PDA 100 to computer 101 over a telecommunications network.

The telecommunications network depicted consists of the following: items 200 are closed switch transmission paths, which are the shortest mathematically self-determined transmission paths of the telecommunications network from PDA 100 to computer 101. Closed switch transmission paths 200 may be either hard-wired or wireless, asymmetric or symmetric.

Items 210 are open switch transmission paths on the telecommunications network. These paths are not mathematically self-determined as being the shortest transmission paths from PDA 100 to computer 101. Open switch transmission paths 210 may be either hard-wired or wireless, asymmetric or symmetric.

The closed switch transmission paths 200 and the open switch transmission paths 210 are inter-connected between nodes 300, 301, 302, 303, 304, 305 has a distinct geo-position, shown as northings and westings in FIG. 1. nodes 300, 301, 302, 303, 304, 305 are intelligent.

An intelligent node 300, 301, 302, 303, 304, 305 can read and use geo-position header data in a telecommunications data packet, to mathematically self-determine the shortest route between PDA 100 and computer 101. The data required is the geo-position of the origination device PDA 100, the geo-position of a node 300, 301, 302, 303, 304, 305, the geo-position of each node it is directly connected to, and the geo-position of the destination device, computer 101.

Prior to the telecommunication of data packets, some or all of the following call set-up information is required:

1) How long is the data packet?
2) Is the destination fixed or mobile?
3) Is the origination fixed or mobile?
4) Is the communication link asymmetric or symmetric?
5) Is the destination local or long distance?

As data packets are transmitted between PDA 100 and computer 101 nodes 300, 301, 302, 303, 304, 305 use geo-position data to mathematically self-determine the shortest route. The purpose of this example is to show that an open switch on the shortest transmission path will not change the mathematical calculations to choose the next shortest route. Node 302 has previously forced the switch to remain open on transmission path 210 from node 302 to computer 101 due to either overload or repair. The following mathematics is related to node 302. Other nodes 300, 301, 303, 304, 305 will perform similar calculations based on their specific geo-position data.

For the purpose of this discussion northings and westings are positive numbers, and southings and eastings are negative numbers.

1) Node 302 processor subtracts computer 101 northing from PDA 100 northing.
2) Node 302 processor temporarily stores northing difference result.

PDA 100N−Computer 101N=Northing Delta (Total Transmission Path)

3) Node 302 processor subtracts computer 101 westing from PDA 100 westing.
4) Node 302 processor temporarily stores westing difference result.

PDA 100W−Computer 101W=Westing Delta (Total Transmission Path)

5) Node 302 processor subtracts northing of node 305 from northing of node 302.
6) Node 302 processor temporarily stores result from step 5.

node 302N−node 305N=Northing Delta (node 302 to node 305)

7) Node 302 processor subtracts westing of node 305 from westing of node 302.
8) Node 302 processor temporarily stores result from step 7.

node 302W−node 305W=Westing Delta (node 302 to node 305)

9) Node 302 processor subtracts northing of node 303 from northing of node 302.
10) Node 302 processor temporarily stores result from step 9.

node 302N−node 303N=Northing Delta (node 302 to node 303)

11) Node 302 processor subtracts westing node 303 from westing of node 302.
12) Node 302 processor temporarily stores result from step 11.

node 302W−node 303W=Westing Delta (node 302 to node 303)

13) Node 302 processor subtracts value stored in step 6 from value stored in step 2.
14) Node 302 processor temporarily stores result from step 13.

Step 2−Step 6=Northing Delta

Total Transmission Path Northing Difference Minus node 302 To node 305 Northing Difference 15) Node 302 processor subtracts value stored in step 8 from value stored in step 4.
16) Node 302 processor temporarily stores results from step 15.

Step 4−Step 8=Westing Delta

Total Transmission Path Westing Difference Minus node 302 To node 305 Westing Difference 17) Node 302 processor subtracts value stored in step 10 from value stored in step 2.
18) Node 302 processor temporarily stores results from step 17.

Step 2−Step 10=Northing Delta

Total Transmission Path Northing Difference Minus node 302 To node 303 Northing Difference 19) Node 302 processor subtracts value stored in step 12 from value stored in step 4.
20) Node 302 processor temporarily stores results from step 19.

Step 4−Step 12=Westing Delta

Total Transmission Path Westing Difference Minus node 302 To node 303 Westing Difference 21) Node 302 processor adds value stored in step 14 to value stored in step 16.
22) Node 302 processor temporarily stores results from step 21.

Step 14+Step 16=Directional Indicator For node 305

For this discussion, the term Directional Indicator is not absolute distance and direction, but is a weighted value based on accumulated Northings and Westings of the Total Transmission Path in relationship to a specific node.

23) Node 302 adds value stored in step 18 to value stored in step 20.
24) Node 302 processor temporarily stores results from step 23.

Step 18+Step 20=Directional Indicator For node 303

25) Node 302 processor uses smallest value stored in step 22 and step 24 as the logic to close the switch to node 303, and open the switch to node 305.

Switch from node 302 to Computer 101 is open for maintenance

If: step 22<step 24,
Then: close switch to node 305,
Otherwise: open switch to node 305,
If: node 305 switch is open,
Then: close switch to node 303,
Otherwise: open switch to node 303

Figure 3:
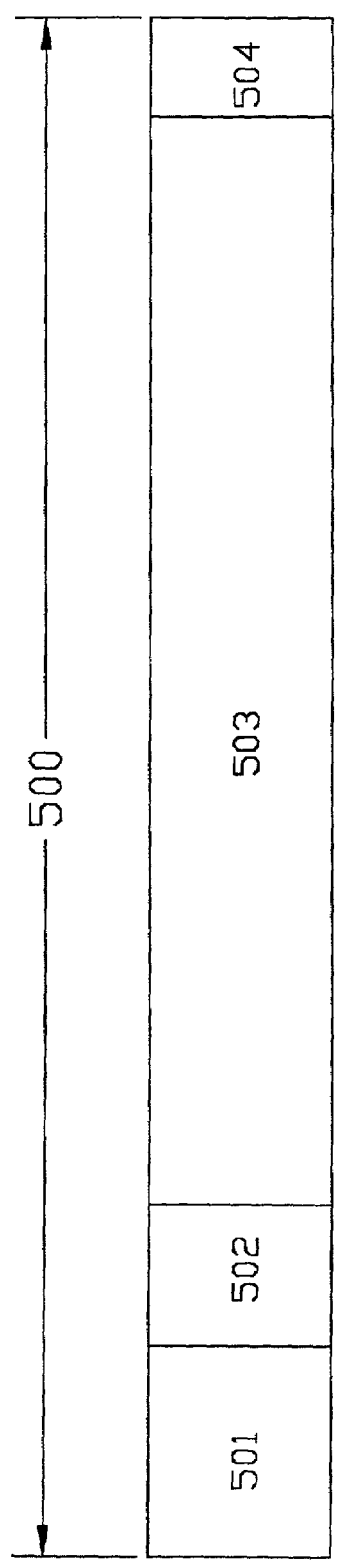
FIG. 3 is a representation of a Structured Linear Database with header space designed for geo-position data.

FIG. 3 depicts an alternate type of data packet based on a Structured Linear Database, which is described in detail in U.S. patent application Ser. No. 09/698,793 or entitled METHOD OF TRANSMITTING DATA INCLUDING A STRUCTURED LINEAR DATABASE, to Melick, et al. The Structured Linear Database data packet 500 is comprised of position 501, 502, 503, 504. Position 501 is the space reserved for the geo-position header data. The minimum geo-position data required in the header is the geo-position of the device originating the data packet, and the destination device. Position 502 is the space reserved for the Linear File Allocation Table (LFAT). The LFAT 502 is the template that unlocks the encrypted data 503 contained in the Structured Linear Database data packet 500. Position 503 is the space reserved for the encrypted data contained in the Structured Linear Database data packet 500. Position 504 is the space reserved for the tailbit. The tailbit 504 defines the end of the Structured Linear Database data packet 500.

A still yet further feature of the present invention is the provision of a method of using geo-position IP address in conjunction with GPS time and date stamps to automatically create unique identification numbers that can become the basis of a mathematically significant, world-wide, universal numbering system that will identify the sender by geo-position, and with the addition of the GPS time and date stamp to the geo-position create unique purchase order numbers, ship confirm numbers, pallet identifiers, order numbers, etc., and can be used as self-routers for all types of business transactions. Outdoor geo-position information may be obtained using any Global Navigation Satellite System, such as GPS or GLONASS.

Indoor geo-positions may be obtained by any number of means. There are patented schemes such Speasl et al, U.S. Pat. No. 5,952,958, or an ultra wideband system such as Robert J. Fontana, U.S. Pat. No. 6,054,950, or the time domain, ultra wideband system that is integrated and correlated with GPS and documented in U.S. patent application Ser. No. 09/686,181, Melick et al.

In addition, indoor and outdoor geo-position information may be obtained from commercially available software that drives map based information. Commercially available software such as AutoCAD MAP, and AutoCAD Mapguide can be used to control, store, and retrieve GIS data, and other data stored in other types of databases.

GPS time and date stamps may be obtained from any number of sources, such as, a GPS receiver operating outdoors. Also, when GPS time and date stamps are required indoors, master clocks are available that collect GPS data via a GPS antenna located in direct line-of-sight of GPS satellites and are connected to a GPS master clock unit. As examples, GPS master clocks are commercially available from Pitrone and Associates Model MGP-25, and from Spectracom using either their Models 8189 GPS Master Clock or 8188 Ethernet Time Server.

Examples of geo-position based IP addresses with the addition of GPS date and time stamps create unique identification numbers such as, but not limited to, the two shown below.

Example 1) In Lat/Long/Alt—Consists Of 5 Components
42.02.17.00=Latitude North (Deg., Min., Sec., Decimal Seconds)
90.05.18.05=Longitude West(Deg., Min., Sec., Decimal Seconds)
285.00=Altitude (Feet., Decimal Feet)
0964=GPS Week
514473=GPS Time Stamp (Truncated To A Whole Number)(Time In Seconds From Beginning Of GPS Week)
A Lat/Long/Alt geo-position IP address with GPS week and time stamp might look like:
042021700.090051805.0028500.0964.514473
Example 2) Earth Centered Earth Fixed (ECEF)—Consists of 6 Components
"ECEF=Cartesian coordinates with center of earth being 0,0,0, (x,y,z)"
10,000,000.56=Northing from Greenwich (Meters., Decimal Meters)
8,900,753.45=Easting from Greenwich (Meters., Decimal Meters)
285.00=Altitude Above Mean Sea Level (Feet., Decimal Feet)
Code No. For Datum, i.e. WGS84=1, North American 1927=2, Cape Canaveral=3, European 1979=4, etc.
0964=GPS Week
514473=GPS Time Stamp (Truncated To A Whole Number)(Time In Seconds From Beginning Of GPS Week)
An ECEF geo-position IP address with a GPS time and date stamp might look like:
1000000056.0890075345.0028500.03.0964.514473

As an example, a person in Company A wants to make a new purchase order using a geo-position IP address combined with a GPS time and date stamp. This creates a unique identifier that can't be numerically repeated. Company A's computer would mark its geo-position and create a GPS time and date stamp using an integrated business system software package of their choice. The geo-position IP address will identify the computer by geo-position. The geo-position IP address will also be used as a telecommunication data packet header in order to self-route the purchase order as an electronic document over any network. Company A would also specify delivery location and date using same the format described above. As these unique identifiers are mathematically significant numbers, they could be used by third party shippers to drive GIS software in order to plan pick-up and deliveries of product from Company Z using the geo-position IP addresses and GPS time and dates.

Company Z receiving the purchase order would confirm the receipt of Company A's purchase order by creating their own unique identifier and add it to the purchase order data packet.

A general description of the present invention as well as a preferred embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims appended hereto.

What is claimed is:

1. A method of routing data stored on a first device over a telecommunications network to a second device wherein the transmission path is based in part on geographic position, the method comprising:
   contacting a second device's home network server over the transmission path between the first device and the second device's home network server, wherein the second device geographic position is stored on the home network server and periodically updated as location of the second device changes;
   sending a request from the first device for the second device geographic position to the home network server;
   receiving at the first device, the second device geographic position from the home network server over the transmission path into memory;
   transmitting the data and second device geographic position from the first device over the transmission path to a node having a node geographic position, wherein the node reads the second device geographic position, accesses a recipient geographic position for possible recipients, accesses the node geographic position, compares the node geographic position with the second device geographic position and selects a recipient based at least in part on the geographic proximity of the recipient to the second device; and
   transmitting the data from the node to the recipient over the transmission path.

2. The method of routing data stored on a first device over a telecommunications network to a second device wherein the transmission path is based in part on geographic position of claim 1 wherein the transmission path is wired.

3. The method of routing data stored on a first device over a telecommunications network to a second device wherein the transmission path is based in part on geographic position of claim 1 wherein the transmission path is wireless.

4. The method of routing data stored on a first device over a telecommunications network to a second device wherein the transmission path is based in part on geographic position of claim 1 wherein the transmission path includes wireless and wired portions.

5. The method of routing data stored on a first device over a telecommunications network to a second device wherein the transmission path is based in part on geographic position of claim 1 wherein the second device geographic position is transmitted as at least a part of an internet protocol address.

6. The method of routing data stored on a first device over a telecommunications network to a second device wherein the transmission path is based in part on geographic position of claim 1 wherein the second device geographic position is supplemented with a device identifier and wherein the device identifier identifies the second device in a manner independent from the geographic position of the second device.

7. The method of routing data stored on a first device over a telecommunications network to a second device wherein the transmission path is based in part on geographic position of claim 1 wherein the second device is the recipient.

* * * * *